Oct. 25, 1927.
U. BISCHOF
1,646,783
APPARATUS FOR SHEET FASTENING MACHINES FOR APPLYING ADHESIVE TO THE SHEETS
Filed June 11, 1924          8 Sheets-Sheet 4
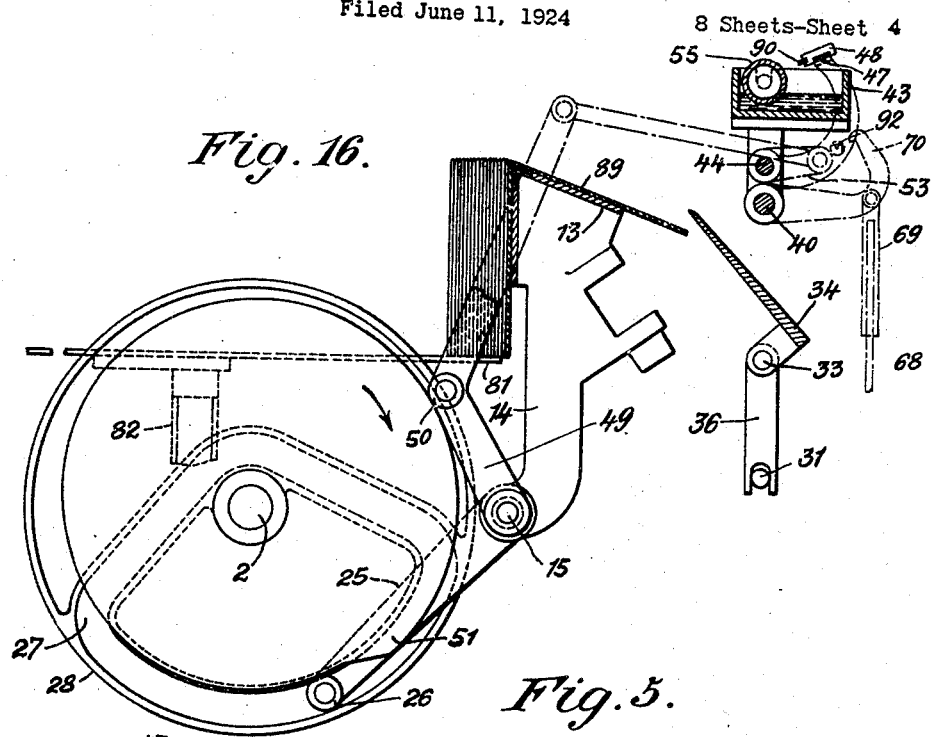
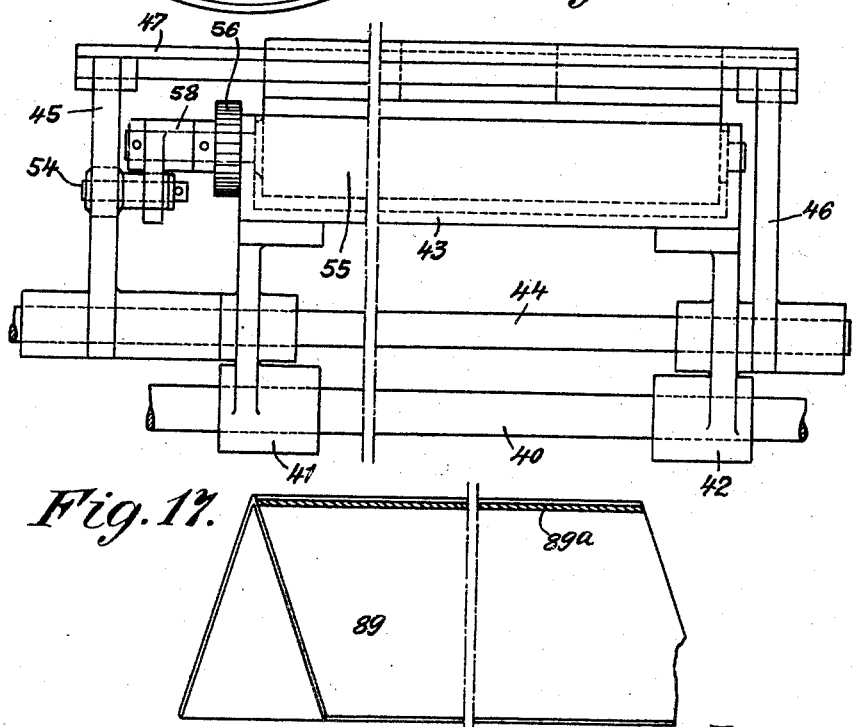
Inventor
U. Bischof
By Marks & Clerk Oct. 25, 1927. 1,646,783
U. BISCHOF
APPARATUS FOR SHEET FASTENING MACHINES FOR APPLYING ADHESIVE TO THE SHEETS
Filed June 11, 1924 8 Sheets-Sheet 5

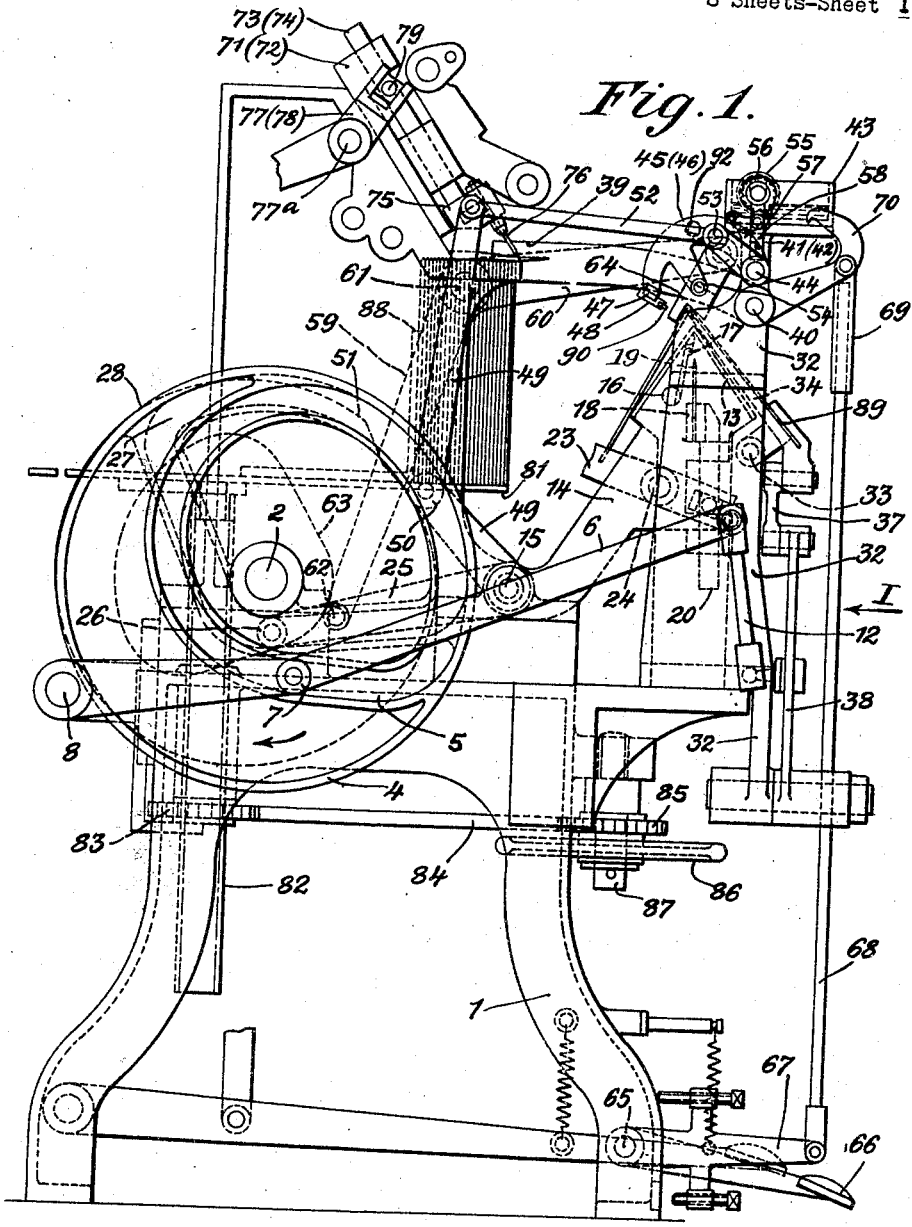

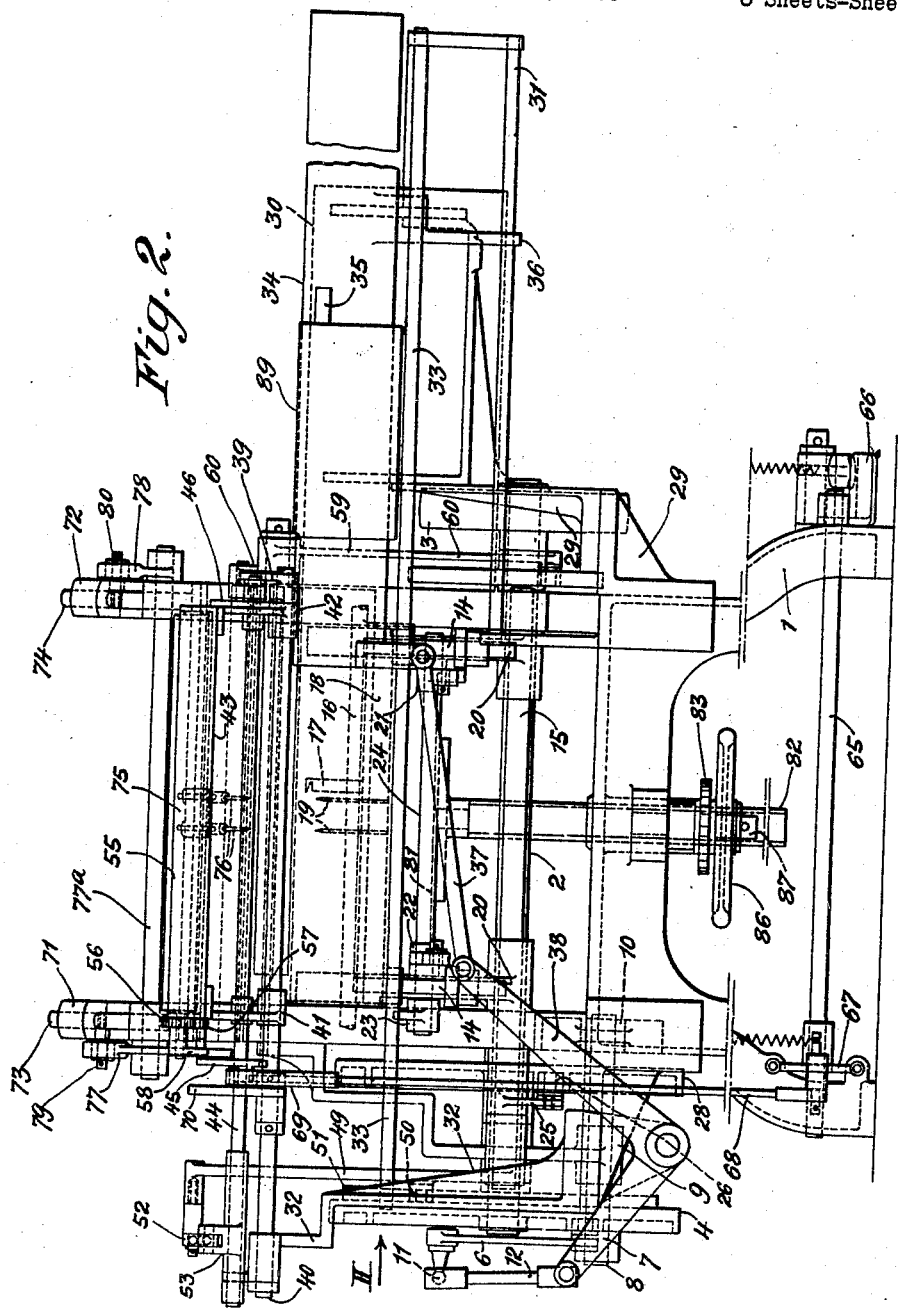

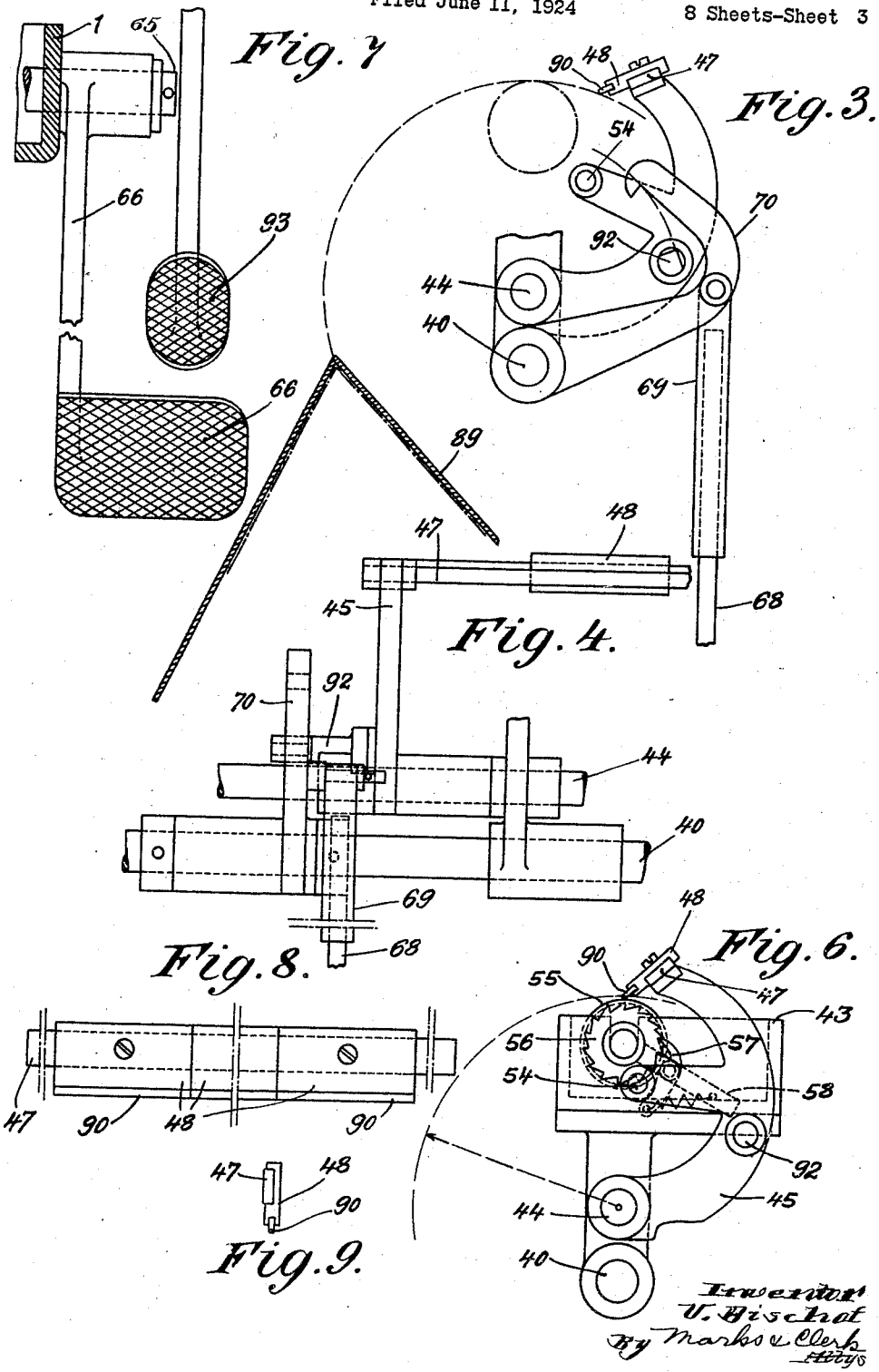

Inventor
U. Bischof
By Marks & Clerk

Oct. 25, 1927.  
U. BISCHOF  
1,646,783  
APPARATUS FOR SHEET FASTENING MACHINES FOR APPLYING ADHESIVE TO THE SHEETS  
Filed June 11, 1924    8 Sheets-Sheet 6

Inventor  
U. Bischof  
by Marks & Clerk

Oct. 25, 1927. 1,646,783
U. BISCHOF
APPARATUS FOR SHEET FASTENING MACHINES FOR APPLYING ADHESIVE TO THE SHEETS
Filed June 11, 1924   8 Sheets-Sheet 7

Inventor
U. Bischof,
By Marks & Clerk
Attys.

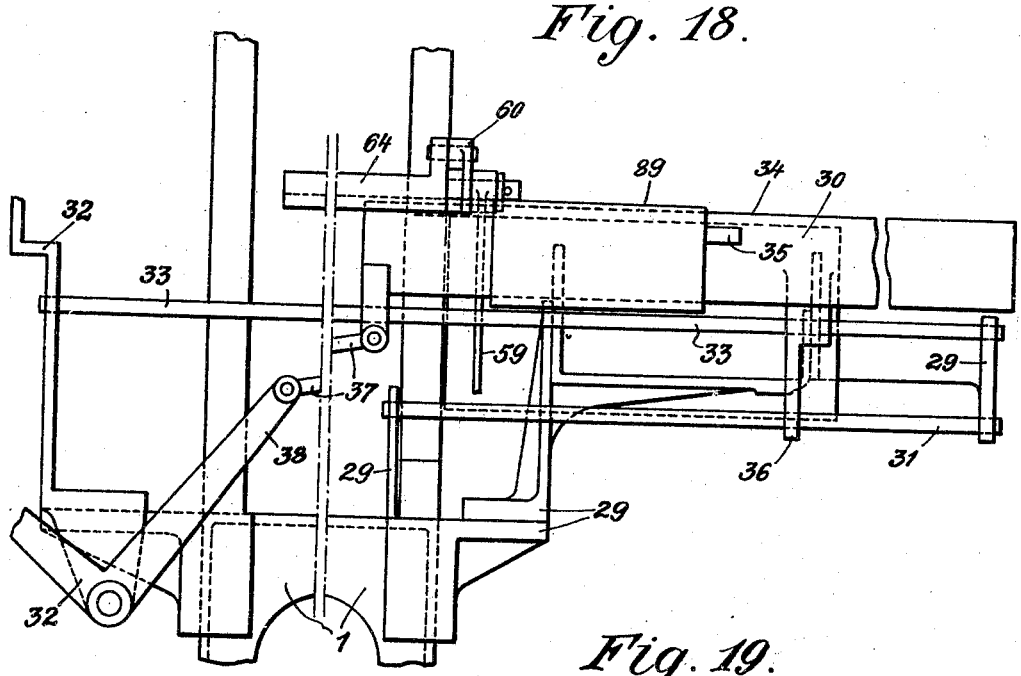
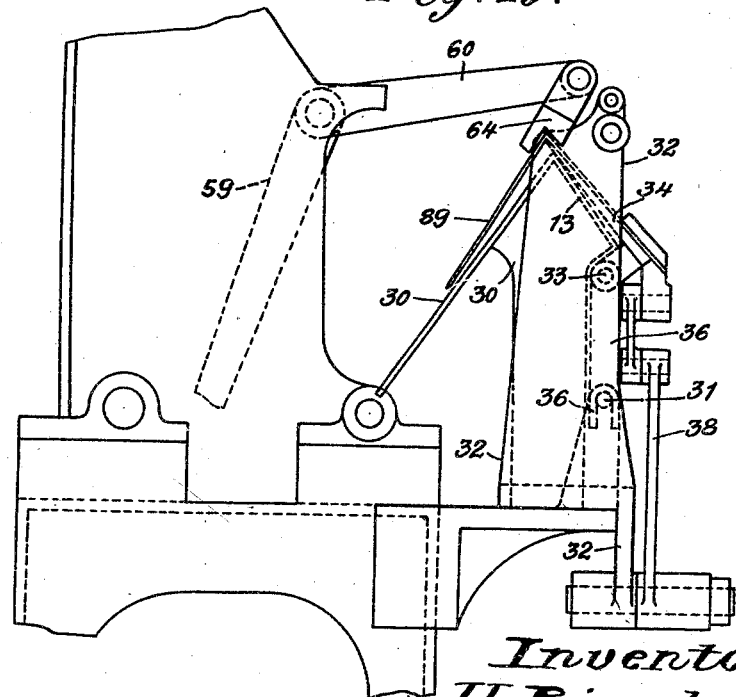

Patented Oct. 25, 1927.

1,646,783

UNITED STATES PATENT OFFICE.

ULRICH BISCHOF, OF HORGEN, SWITZERLAND, ASSIGNOR, BY MESNE ASSIGNMENTS, TO SMYTH MANUFACTURING COMPANY, OF HARTFORD, CONNECTICUT, A CORPORATION OF CONNECTICUT.

APPARATUS FOR SHEET-FASTENING MACHINES FOR APPLYING ADHESIVE TO THE SHEETS.

Application filed June 11, 1924, Serial No. 719,445, and in Switzerland April 4, 1924.

The hitherto known apparatus for sheet-fastening machines for the automatic application of adhesive (hereinafter called the "gum") to the sheets, are very complicated and dear; they also necessitate the expenditure of considerable labour and time on the part of the operator of the machine.

The present invention has now for its object to effect the application of the gum to the sheets simply and cheaply, as well as more rapidly than hitherto, whilst also simplifying the manipulation of the same. This is achieved according to the present invention by the combination with a gum tank of a roller rotatably located in the gum tank, a shaft located vertically under the said roller, swinging levers fixed to the said shaft and supporting the gummers and cam operated means to impart a rocking motion to the said shaft and levers, which levers are capable of imparting to the gummers a tangential motion in regard to the said roller to force them to take up gum in the forward and in the backward swinging motion of the levers.

A practical constructional form of a machine of this kind is illustrated by way of example in the accompanying drawings but only to the extent required for enabling the nature of the invention to be understood.

Figure 1 is a side elevation of the machine, viewed in the direction of the arrow II in Figure 2, and Figure 2 is a front elevation viewed in the direction of the arrow I in Figure 1.

Figures 3 and 4 illustrate a detail of Figures 1 and 2.

Figures 5 and 6 are respectively a front elevation and side elevation of the gumming apparatus.

Figure 7 is a plan of the treadles and Figures 8 and 9 illustrate the bar with the gumming dabbers.

Figures 10 to 16 show the apparatus in various working positions, and

Figure 17 shows a gummed sheet.

Figures 18 and 19 are details of Figures 1 and 2.

Figure 10:
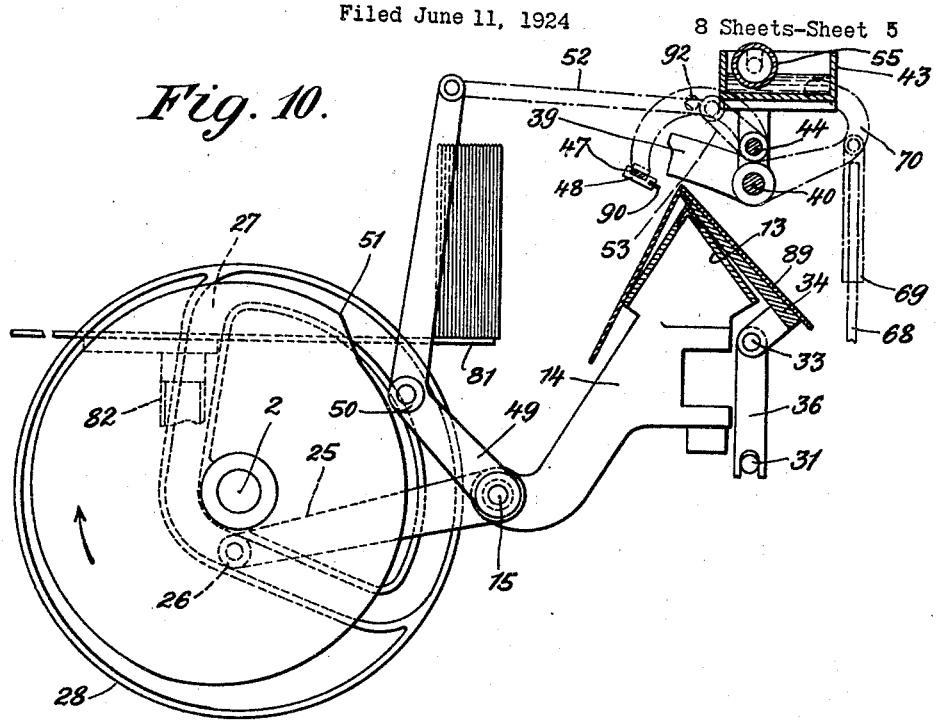
Figure 11:
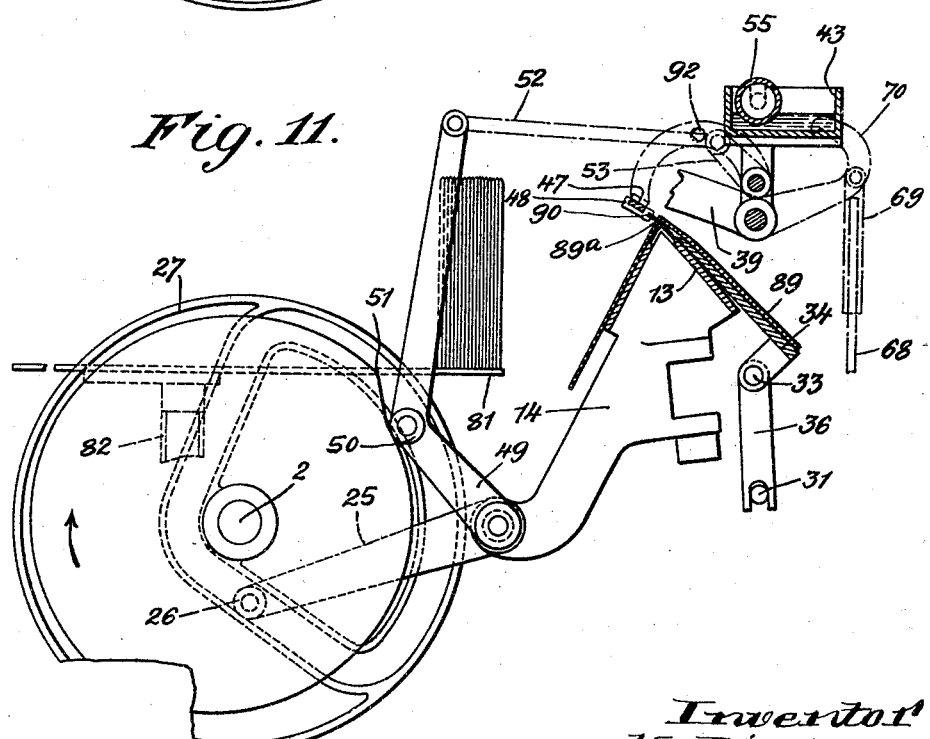

In Figures 1 and 2:—1 is the machine framing; 2 is the main shaft mounted therein; 3 is the driving pulley, and 4 is a disc, both located on said shaft. On a rocking lever 6 is an antifriction roller 7 working in a groove 5 in the disc 4. A shaft 8, on which said rocking lever 6 is mounted, is carried in bearings 9 and 10 in the framing. The lever 6 carries at its free end by means of a ball-and-socket joint 11 a link 12 the function of which is hereinafter described. 13 (Figs. 1 and 10 to 16) is a saddle-shaped table for receiving the sheets to be fastened. This table is fixed by means of arms 14 on a shaft 15 which is mounted in the machine framing 1. In the two arms 14 that carry the table 13, there is located a rod 16 (see Figures 1 and 2) to which is fixed the known reciprocating thread-looper 17 required for making the stitches. In the arms 14 there is further located a bar 18 (Figs. 1 and 2) with the bodkins 19; only two of these bodkins are shown.

The bar 18 is fixed on pins 20 which are slidably mounted in bearings in the table 13. The means for moving the rod 16 to-and-fro are known, and are therefore not shown.

The bar 18 is moved up and down by levers 21, 22, 23 fixed on a shaft 24 (Figs. 1 and 2), which is mounted in the table 13 and is actuated by known means.

On the shaft 15 there is located an arm 25 (Figs. 1 and 10 to 16) which carries at its free end an antifriction roller 26. This roller works in a cam groove 27 formed in a disc 28 that is fixed on the shaft 2. When the shaft 2 rotates with the disc 28, the cam groove 27 acts through the arms 25 and 14 to impart an inward and outward rocking motion to the table 13.

On the machine framing 1 there is fixed by means of a bracket 29 (Fig. 2) an auxiliary table 30 (Figures 2, 18 and 19) which has a shape similar to that of the table 13, and has fixed to it a rod 31. In the bracket 29 and also in a bracket 32 located at the other end of the machine framing there is located a rod 33 along which can slide a slide 34 (Figs. 1 and 2) having a stop 35. This slide 34 has a guide arm 36 which extends downwards and engages the rod 31; it is further connected pivotally to a link 37 which is in its turn pivotally connected to a bell crank lever 38 mounted on the bracket 32. The lever 38 again is connected by a ball-and-socket joint to the link 12 located on the rocking lever 6.

From the foregoing it will be perceived that the oscillations of the lever 6 produce to-and-fro movements of the slide 34.

40 (Figures 1–6 and 10–16) is a stationary shaft mounted in the upper end of the bracket 32 (Figs. 1 and 2) and also in a bracket 39 fixed at the other end of the machine framing. On this shaft 40 are fixed two supports 41 and 42 (Figs. 1, 2 and 5) for the gum tank 43. 44 is a shaft (Figs. 10 to 16) mounted rotatably in the two supports 41 and 42 and in the upper end of the bracket 32. On this shaft 44 are fixed two levers 45 and 46 (Figs. 1, 2, 4 and 5 and 6) together with the dabber bar 47 (Figs. 1, 3–6 and 8–16) that carries the dabbers 48. 49 is a lever located on the shaft 15 (Figs. 1, 2 and 10 to 16); it carries an antifriction roller 50 which bears on the cam disc 51. The upper end of the lever 49 is connected by a link 52 to a lever 53 that is fixed on the shaft 44.

It will be readily perceived that when the cam disc 51 is rotated, the dabbers 48 will receive a circular rocking motion through the medium of the parts 47, 49, 50, 52 and 53. On the lever 45 is a pin 54 (Figs. 1, 5 and 6) which imparts periodic rotational motion to a roller 55 located in the gum tank 43, by means of a ratchet wheel 56 and a driving pawl 58 furnished with a latch-pawl 57. The shaft 44 is located vertically under the gum roller 55 so that the gummers tangentially move over this roller and take up gum when the levers 45 and 46 swing forward and backward. The arm 59 (Figs. 1 and 2) of a bell-crank lever 59—60 mounted on a pin 61 located in the machine framing, bears with an antifriction roller 62 on a cam disc 63 fixed on the shaft 2, whilst the other arm 60 is furnished with a sheet-guiding device 64. The arrangement is such that the oscillations imparted by the cam disc 63 to the arm 59 cause in the known manner the sheet-guiding device to move up and down.

In the lower part of the framing 1 (Figs. 1 and 2) there is mounted a shaft 65 on one end of which there is fixed an operating treadle 66 (Fig. 7), and on its other end a lever 67. By means of a rod 68 (Figs. 1, 2, 3, 10 to 16) and a sleeve 69 which is slidable on a limited path along the rod 68 the lever 67 is connected adjustably to a locking hook 70 which is rotatably mounted on the shaft 40, and is depressed by applying pressure to the treadle 66.

71 and 72 (Figs. 1 and 2) are supports for the known sewing apparatus and 73 and 74 are guide bars on which the needle carrier 75 is located with the needles 76. 77 and 78 are levers fixed on a shaft 77ª (Figs. 1 and 2) mounted in the machine framing 1. These levers have a forked arm and a perforated block with which they engage pins 79, 80 fixed in the guide bars 73, 74 and thus cause the needle carrier 75 to move up and down in the known manner.

81 is a table (Figs. 1, 2 and 10 to 16) for receiving the fastened sheets. This table (hereinafter referred to as the "book-table") rests upon a screw spindle 82 (Figures 1 and 2) mounted in the machine framing 1 and carries a nut having the form of a chain wheel 83 which is connected by a chain 84 to a chain wheel 85 mounted together with a handwheel 86 loose on a pin 87 fixed in the machine framing. By suitably rotating the handwheel the book-table can be adjusted as to height. 88 is an angle-piece slidable on the table; it serves as a vertical support for the fastened sheets.

Figure 12:
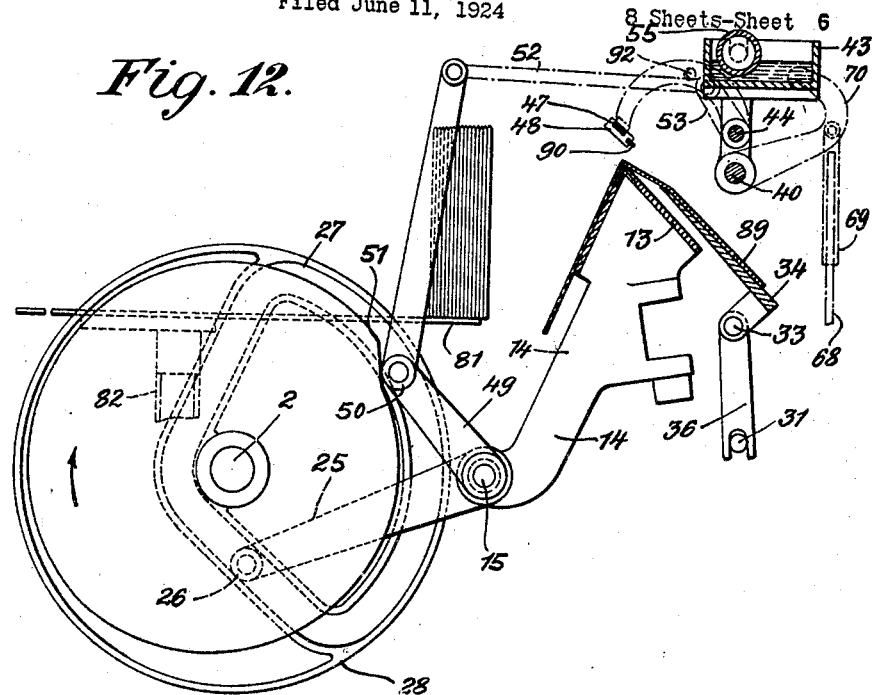

The manner of operation of the above described improved machine is as follows:

It is assumed the operator has thus placed a sheet 89 upon the slide 34, that the right hand edge of the sheet lies against the left hand edge of the stop 35 (see Figs. 2 and 18); that the table 13 occupies the extreme right-hand position shown in Figs. 1 and 2; and that the sheet guiding 64 is situated in its lowest position shown in Fig. 1. The rotation of the cam disc 4 in the direction of the arrow shown in Fig. 1 has the result, that by means of the levers 36 and 38 and of the links 12 and 37, the slide 34 will move towards the left, with the result, that the stop 35 pushes the sheet 89 on the table 13 and underneath the sheet guiding device 64 (Figs. 1 and 10). In this position the inner flap of the sheet lies on the table saddle 13 and the front portion thereof still lies on the sheet slide 34 and remains in this position until the table saddle 13 moves inwardly. At the same time the dabbers 48 occupying their initial position (Fig. 16) have been swung forwards towards the bound sheets and over the roller 55 and have taken up gum from the latter. Finally the dabbers 48 reach their lowest position shown in Fig. 1, the movement being imparted to the dabbers by means of the cam disc 51 and the members 49, 50, 52 and 53. The cam 63 then acts upon the arm 59 of the bell-crank-lever 59—60, whereby the sheet guiding device 64 is moved up out of the range of the table saddle. At the same time, by the action of the cam disc 28 and the lever 25 the table 13 has been moved to the left such a distance until the upper edge of the table 13 is in a line with the sharp pointed edge of the sheet slide. In the further inward movement of the table the same grasps the sheet with the top edge, whereby the sheet slide perfectly snugs to the table 13 with its sharp edge and thereby facilitates the taking off of the sheet. The top edge of the table 13 thus draws inwards the sheet 89 away from the edge of the sheet slide being in resting position, whereby the sheet comes against the gum covered dabbers 48 of the bar 47 and a strip of gum 89ª is transferred to the sheet 89 (Figs. 11 and 17) by the gum carriers 90 (Figs. 8 and 9). Hereupon the cam disc 51 by acting upon the lever 49 and with the help of the link 52 and the levers 45, 46 and 53 causes the bar 47 with the gummers 48 to rise whilst the said bar rocks slightly backwards at the same time (Fig. 12).

In this manner the table 13 has a free path given to it to rock into its extreme position on the left (Fig. 5) wherein the gummed sheet 89 is already waiting underneath the needles 76 ready to be fastened (stitched) together in the well known manner.

Figure 13:
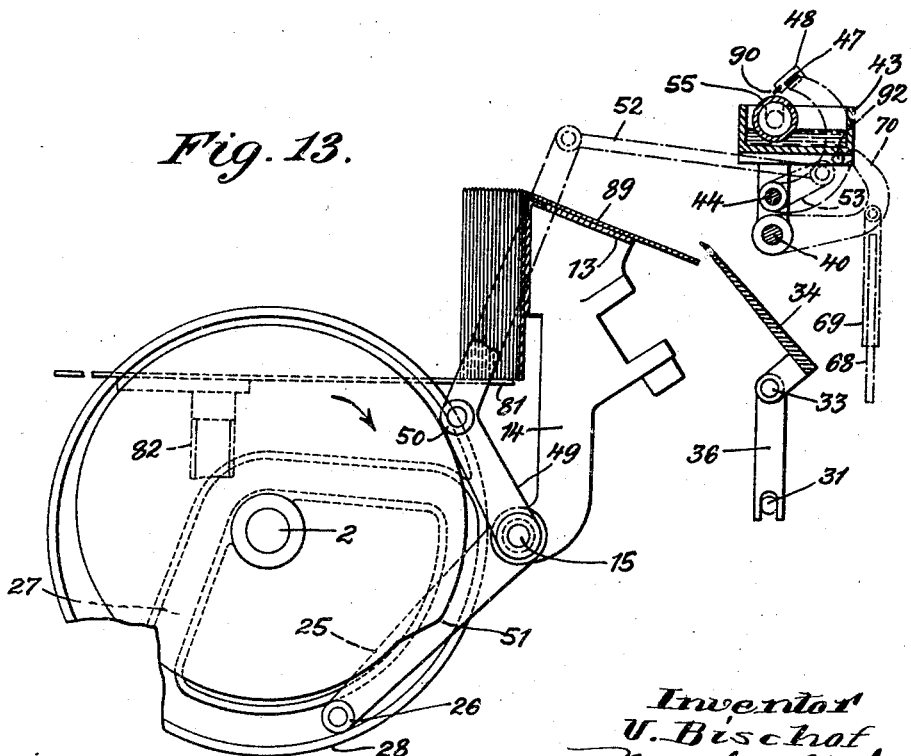
Figure 14:
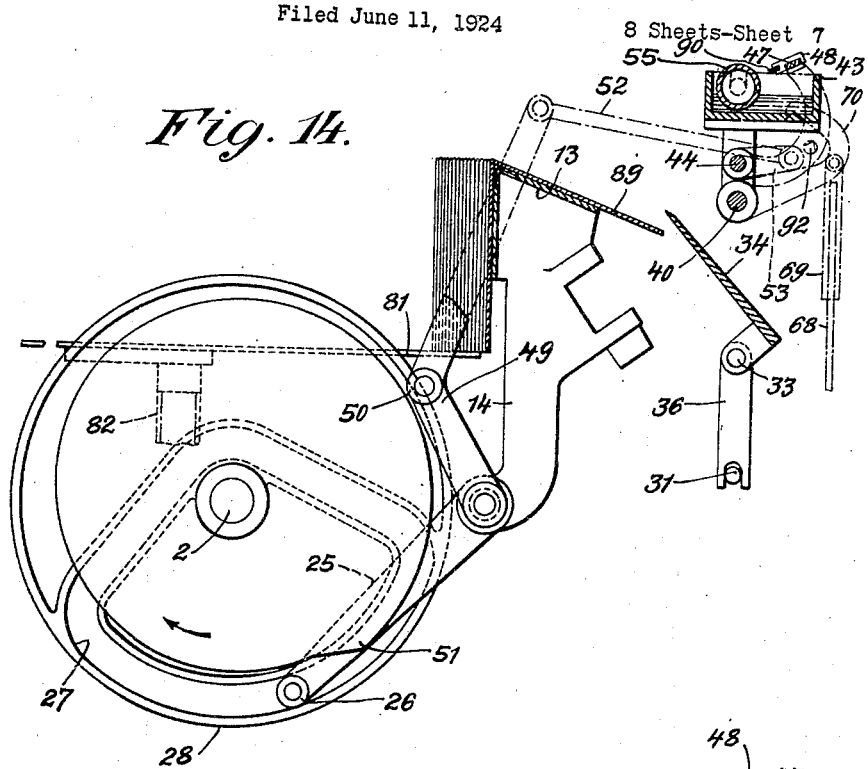

When the bar 47 with the gummers has reached the highest position as shown in Fig. 13, the rubber bodies 90 located on the gummers 48, lie against the roller 55 from which they take up gum. After the table 13 with the sheet has moved into its extreme position on the left, the slide 34 is caused by the action of the parts 5, 6, 12, 37 and 38 to move into the outermost position on the right. During this time the sheets are stitched in the known manner. This is done in such a manner that the bodkins 19 are quickly lifted and lowered, to pierce the sheet (Figs. 1 and 2), by means of the levers 21, 22, 23 and by the bar 18. Hereupon the levers 77, 78 are so turned by the action of a cam (not shown), that the needle bars 73 and 74 and therewith the stitching needle with the inserted thread as also the hooked needle 76, the hook of which faces towards the front and is surrounded by a thread loop, enter into the previously pierced holes. After having reached the lowest position, the needles again are slightly lifted to form the loop of the stitching thread whereupon they remain stationary until the thread loop formed by the stitching needle has been carried over to the hooked needle. Thus the thread looper when moving to the left grasps the thread loop, draws it over and deposes it in the hook facing backwards and having been turned for 180° by known means not shown. The thread loop brought up by the thread looper 17 is then caught by the hooked needle when the needles are lifted, whereupon the caught thread loop is pulled through the loop of the previously stitched sheet, surrounding the hooked needle, without taking with this loop. When the needles have reached their highest position, the hooked needle is again turned for 180°, so that the hook again faces to the front. During this operation the thread is tightened up and fed by the known thread tension device not shown. The stitching operation for one sheet is now completely terminated and the sheet is now connected by sewing and chain stitches to the previously stitched sheets resting on the table 81. The cover of a book being fixed to the first and last sheets have still to be provided, beside the thread stitching, with a gum strip, whereby the first sheet is well connected to the second and the last one to the last but one sheet. The sheets are therefore successively stitched together to books and the latter are pushed rearward upon the table 81 by the table 13 every time for the thickness of a sheet. Afterwards the hooks are cut one from the other behind at the machine, and taken away.

Figure 15:
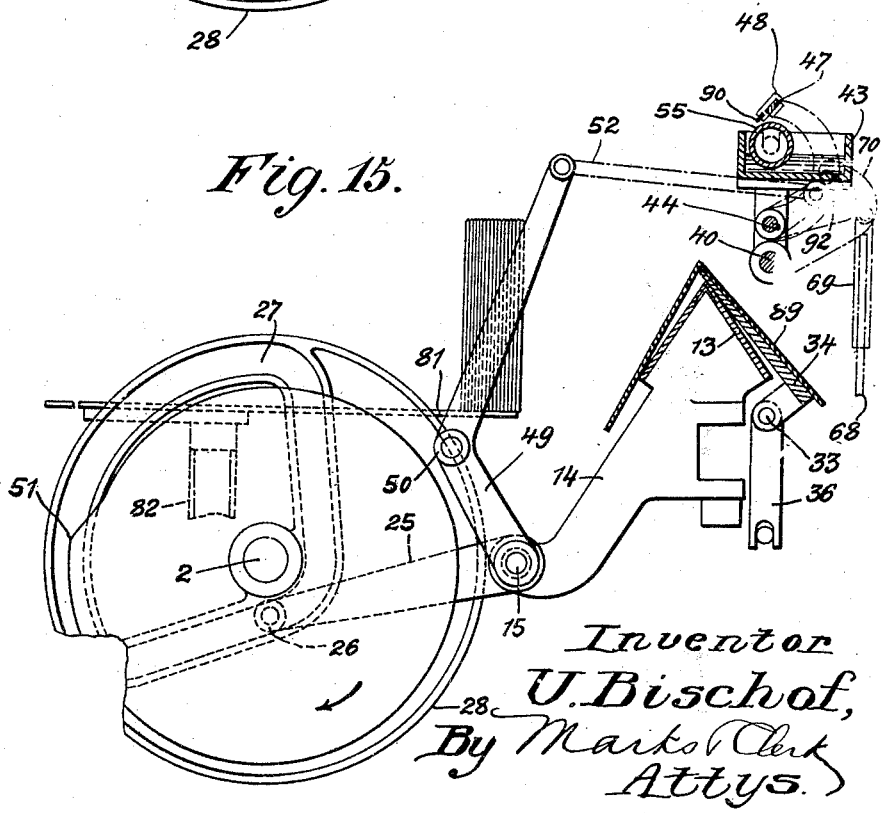

When the stitching is completed, the cam disc 28 and arms 25 and 14 cause the table 13 to swing to the right again in order to receive a fresh sheet (Fig. 15). Meanwhile the slide 34 has moved back into its extreme right-hand position (Fig. 2), and by the cam disc 63 the sheet-guiding device 64 is brought back into the position shown in Figs. 1, 18 and 19; the same result takes place in the case of the bar 47 and the gummers 48 by the action of the cam disc 51. A fresh sheet may now be placed on and the operation as described repeated. The fresh sheet is carried by the slide 34, the auxiliary table 30 having the purpose to serve to the rear half of the sheet as guide and support. The rear plate of the auxiliary table exactly is in the same plane with that of the table 13, when the latter is in its extreme position on the right, so that the sheet may freely slide from one to the other. The auxiliary table also serves as carrier of the rods 31 and 33 for the slide 34.

At each ascent of the lever 45 the pin 54 (Fig. 5), fixed to it, strikes the lever 58 located loose on the roller 55, and thus by means of the driving pawl 57 and ratchet wheel 56, rotates the roller 55 one tooth further on. By this means the roller is rotated in the usual manner, and a guarantee is given that the gum-carriers 90 shall always come to bear upon a freshly gum-covered spot of the roller 55, and thus take up gum with certainty (Figs. 6 and 13).

It may happen that some of the sheets to be fastened together do not get gummed. It is in order to obtain this purpose that the parts 65 to 70 (Figs. 1 to 4 and 7) are provided. If the treadle 66 is pressed down by the foot of the operator, the locking hook 70 moves down into the position shown in Fig. 16, whereupon as the bar 47 with the gummers 48, moves upward the taking up and delivering of the gum are made possible (Fig. 16). If however the treadle 66 is released, the locking hook 70 assumes the position shown in Figs. 1, 2, 3 and 4, and on the now following backward rocking movement of the bar 47 with the gummers and levers 45, 46, the pin 92 fixed in the lever 45 comes against the locking hook 70 (Fig. 13) and pushes the latter backwards to the right until the hook 70 snaps forwards over the pin 92 into the position shown in Fig. 14. The locking hook 70 which together with the sleeve 69 loosely rests on the rod 68, constantly is held in its uppermost position by a traction spring acting upon the lever 67 (Fig. 1). During the forward movement of the gummers to the left, the pin 92 engages the locking hook 70, whereby delivery of gum by the gummers upon the sheets is completely prevented (Fig. 15). When the treadle 66 is pressed down and the locking hook thereby freed of pressure from beneath, the supporting rod 68 freely slidable in the sleeve 69 is lowered, so that the hook 70 by its own weight falls back and releases the gummers 48 for the following pasting operation. The circular rocking motion of the gummers necessitates only one eccentric and actuating mechanism for the gummers whereby the arrangement of the gumming apparatus is rendered very much more simple and cheap than that of other apparatuses hitherto proposed for effecting the same purpose. A further advantage is afforded by the fact, that due to the lockibility of the gummers, it is rendered impossible for the sheets not to be gummed to be soiled with gum and that there are no useless movements with their consequent wear and tear. Moreover, the arrangement of the treadle 66 in front of the known coupling treadle 93 (Fig. 7) for starting the machine is of very great advantage, because the operator, when depressing the coupling lever for starting the machine, can very readily actuate with the same foot also the treadle controlling the gumming mechanism without releasing the other treadle and thereby stopping the machine.

The gummers 48 are mounted in a slidable and removable manner on the bar 47 (Figs. 8 and 9) in order to enable them to be adjusted to suit different sizes of sheets, which adjustment can be done very conveniently simply by the improved apparatus. Moreover, the gum tank can be filled with gum very conveniently, and the roller and the tank can be easily cleaned.

What I claim is:—

1. In an apparatus for sheet-fastening machines, the combination with a gum tank, of a roller rotatably located in the gum tank, a shaft located vertically under the said roller, swinging levers fixed to the said shaft, dabbers supported by the levers, cam operated means to impart a rocking motion to the said shaft and levers, a locking hook to lock the said swinging levers carrying the dabbers in inoperative position when gumming is not desired and a treadle adapted to operate the locking hook.

2. In an apparatus for sheet-fastening machines, the combination with a gum tank, of a roller rotatably located in the gum tank, a shaft located vertically under the said roller, swinging levers fixed to the said shaft, dabbers supported by the levers, cam operated means to impart a rocking motion to the said shaft and levers, a locking hook to lock the said swinging levers carrying the dabbers in inoperative position when gumming is not desired, a treadle adapted to operate the locking hook and a coupling starting treadle, both treadles being so located as to be operated simultaneously by the same foot without changing its position.

3. In an apparatus for sheet-fastening machines, the combination with a gum tank, of a roller rotatably located in the gum tank, a shaft located vertically under the said roller, swinging levers fixed to the said shaft, dabbers supported by the levers, cam operated means to impart a rocking motion to the said shaft and levers, a locking hook to hook the said swinging levers carrying the dabbers in inoperative position when gumming is not desired, a sleeve pivotally connected to the locking hook, a rod loosely fitted in the said sleeve at the top and a treadle device to which the lower part of the said rod is connected for the purpose of lifting this rod and the locking hook, while free lowering of the rod and the treadle is permitted.

In testimony whereof I have affixed my signature.

ULRICH BISCHOF.